US008668570B2

(12) United States Patent
Young

(10) Patent No.: US 8,668,570 B2
(45) Date of Patent: Mar. 11, 2014

(54) METHOD, APPARATUS, AND PROGRAM PRODUCT EMPLOYING A TOUCHSCREEN BUTTON FOR PRESENTING GAME FEATURE INFORMATION IN A GAMING MACHINE

(75) Inventor: Karen J. Young, Burlingame, CA (US)

(73) Assignee: Multimedia Games, Inc., Austin, TX (US)

( * ) Notice: Subject to any disclaimer, the term of this patent is extended or adjusted under 35 U.S.C. 154(b) by 57 days.

(21) Appl. No.: 13/448,228

(22) Filed: Apr. 16, 2012

(65) Prior Publication Data

US 2012/0202591 A1 Aug. 9, 2012

Related U.S. Application Data

(63) Continuation of application No. 12/323,849, filed on Nov. 26, 2008, now Pat. No. 8,157,638.

(60) Provisional application No. 60/990,214, filed on Nov. 26, 2007.

(51) Int. Cl.
*A63F 13/00* (2006.01)

(52) U.S. Cl.
USPC .......... 463/19

(58) Field of Classification Search
USPC .......... 463/16, 19, 20
See application file for complete search history.

(56) References Cited

U.S. PATENT DOCUMENTS 3,516,176 A 6/1970 Cleary et al.
3,645,531 A 2/1972 Wright
3,757,322 A 9/1973 Barkan et al.
RE34,244 E 5/1993 Hagiwara
5,375,830 A 12/1994 Takemoto et al.
5,712,661 A 1/1998 Jaeger
5,774,115 A 6/1998 Jaeger et al.
5,867,149 A 2/1999 Jaeger
6,027,115 A 2/2000 Griswold et al.
6,102,394 A 8/2000 Wurz et al.
6,117,010 A 9/2000 Canterbury et al.
6,454,649 B1 9/2002 Mattice et al.
6,517,433 B2 2/2003 Loose et al.
6,798,359 B1 9/2004 Ivancic
6,817,946 B2 11/2004 Motegi et al.
7,060,922 B2 6/2006 Hoehne et al.
7,071,845 B2 7/2006 Ivancic
7,300,351 B2 11/2007 Thomas
7,477,239 B2 1/2009 Ray
2003/0013514 A1 1/2003 Cregan et al.
2003/0060254 A1 3/2003 Cuddy et al.
(Continued)

*Primary Examiner* — Thomas L Dickey
(74) *Attorney, Agent, or Firm* — Nathan H. Calvert, Esq.; Russell D. Culbertson, Esq.; JP Cody, Esq.

(57) ABSTRACT

A method includes displaying a button graphic on a touch screen video display device associated with a gaming machine. The button graphic defines a button display area on the touch screen video display device which may be touched to cause a touch screen controller associated with the touch screen video display device to generate a game feature input. In response to the game feature input, a game feature in a game offered through the gaming machine is modified in some fashion. In addition to displaying the button graphic, the button graphic is modified to add a first message regarding the game feature. This modification of the button graphic is performed in association with a modification of the game feature, and the first message includes text indicating that the game feature has been modified.

9 Claims, 5 Drawing Sheets

(56) References Cited

U.S. PATENT DOCUMENTS

| | | | |
|---|---|---|---|
| 2003/0069060 A1 | 4/2003 | Seelig et al. | |
| 2003/0166417 A1 | 9/2003 | Moriyama et al. | |
| 2004/0018877 A1 | 1/2004 | Tastad et al. | |
| 2004/0038721 A1 | 2/2004 | Wells | |
| 2004/0038725 A1 | 2/2004 | Kaminkow | |
| 2004/0147310 A1 | 7/2004 | Hosaka | |
| 2004/0166926 A1 | 8/2004 | Adachi et al. | |
| 2004/0214637 A1 | 10/2004 | Nonaka | |
| 2004/0224758 A1 | 11/2004 | Okada et al. | |
| 2004/0266515 A1 | 12/2004 | Gauselmann | |
| 2004/0266517 A1 | 12/2004 | Bleich et al. | |
| 2006/0143573 A1* | 6/2006 | Harrison et al. | 715/768 |
| 2006/0166728 A1 | 7/2006 | Cornell et al. | |
| 2006/0178205 A1 | 8/2006 | Bleich et al. | |
| 2006/0189387 A1 | 8/2006 | Rigsby et al. | |
| 2006/0247047 A1 | 11/2006 | Mitchell et al. | |
| 2006/0247048 A1 | 11/2006 | Mitchell et al. | |
| 2007/0060291 A1 | 3/2007 | Cole et al. | |
| 2007/0060352 A1 | 3/2007 | Cole | |
| 2007/0167223 A1 | 7/2007 | Bleich et al. | |
| 2008/0000763 A1 | 1/2008 | Cove | |
| 2008/0113708 A1 | 5/2008 | Beadell et al. | |
| 2008/0113709 A1 | 5/2008 | Beadell et al. | |
| 2008/0113715 A1 | 5/2008 | Beadell et al. | |
| 2008/0113716 A1 | 5/2008 | Beadell et al. | |
| 2008/0113741 A1 | 5/2008 | Beadell et al. | |
| 2008/0132313 A1 | 6/2008 | Rasmussen et al. | |
| 2008/0135388 A1 | 6/2008 | Hoehne et al. | |
| 2008/0248854 A1 | 10/2008 | Rasmussen et al. | |
| 2009/0036197 A1 | 2/2009 | Anderson et al. | |
| 2009/0098938 A1 | 4/2009 | Anderson et al. | |
| 2009/0291749 A1 | 11/2009 | Durham et al. | |
| 2009/0312083 A1 | 12/2009 | Rasmussen | |
| 2010/0099501 A1 | 4/2010 | Blair et al. | |
| 2010/0291992 A1 | 11/2010 | Greenberg et al. | |

* cited by examiner

METHOD, APPARATUS, AND PROGRAM PRODUCT EMPLOYING A TOUCHSCREEN BUTTON FOR PRESENTING GAME FEATURE INFORMATION IN A GAMING MACHINE

CROSS-REFERENCE TO RELATED APPLICATION

This application is a continuation of U.S. patent application Ser. No. 12/323,849, entitled "Method, Apparatus, and Program Product for Presenting Game Feature Information in a Gaming Machine," filed Nov. 26, 2008, and issued as U.S. Pat. No. 8,157,638, which claimed the benefit, under 35 U.S.C. §119(e), of U.S. Provisional Patent Application Ser. No. 60/990,214 filed Nov. 26, 2007, and entitled "Method, Apparatus, and Program Product for Presenting Game Feature Information for a Gaming Machine." The Applicant hereby claims the benefit of the above-identified nonprovisional application under 35 U.S.C. §120, and claims the benefit of the above-identified provisional application under 35 U.S.C. §119(e). The entire content of each of these prior applications is incorporated herein by this reference.

A portion of the disclosure of this patent document contains material which is subject to copyright protection. The copyright owner has no objection to the facsimile reproduction of the patent documents or the patent disclosure as it appears in the Patent and Trademark Office patent file or records, but otherwise reserves all rights of copyright.

TECHNICAL FIELD OF THE INVENTION

This invention relates to gaming systems and to gaming machines through which players may participate in wagering games. More particularly, the invention relates to methods for providing a player with information regarding a feature of the game in the course of play at a gaming machine. The invention also encompasses gaming machines and program products for presenting game feature information.

BACKGROUND OF THE INVENTION

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video display devices that are used to produce simulations of mechanical spinning reels. These video-based gaming machines may use one or more video display devices to provide a wide variety of graphic effects in addition to simulated spinning reels, and may also provide secondary/bonus games using different reel arrangements or entirely different graphics. Video-based gaming machines may also be used to show card games or various types of competitions such as simulated horse races in which wagers may be placed. Game manufacturers are continuously pressed to develop new game presentations, formats, and game graphics in an attempt to provide high entertainment value for players and thereby attract and retain players.

A video-based gaming machine offering a periodic bonus game as a game feature may require certain actions by the player in order to qualify for participation in the bonus game. For example, a player may be required to make an additional bet (a side bet) to place their gaming machine in an eligible state for the bonus game, or may be required to place a maximum level bet for the primary game. When a player makes the side bet or takes some other player action required for eligibility for the bonus game, the gaming machine changes from a state in which it is ineligible for the bonus game to a state in which it is eligible for the bonus game. Conversely, if the side bet or other action is not made as required to maintain eligibility for the bonus game, the gaming machine changes again to the state in which it is ineligible for the bonus game. Thus the state of the gaming machine changes over time as to eligibility for the bonus game or as to other game features which have a significant impact on the play of the game. It is therefore important to keep the player aware of game feature status (such as bonus game eligibility status, for example), and to make it as easy as possible for the player to take the actions necessary to take advantage of various game features.

SUMMARY OF THE INVENTION

The present invention provides an entertaining and efficient method of providing game feature information to a player at a gaming machine. In particular, the present invention provides an arrangement in which game feature information, such as bonus game eligibility information for a player's gaming machine, is displayed to the player through a video touch screen button graphic that may be touched to take advantage of the game feature. That is, the button graphic itself is modified to provide text information regarding the game feature which the button graphic is used to invoke.

A method embodying principles of the invention may be implemented in a gaming machine using one or more display devices such as CRTs, LCDs, plasma displays, or other types of video display devices, which include a touch screen portion. At least one display device is used to display the button graphic that may be touched to cause a modification to the subject game feature, and that shows the game feature information at appropriate times. One or more display devices may also be used to display the graphics for a game at the gaming machine. It is also possible to show a game using electromechanical display devices, although a suitable video display device with a touch screen portion would still be required to display the button graphic. As used in this disclosure and the accompanying claims, a gaming machine through which the present invention may be implemented will be referred to generally as a "gaming machine" regardless of the nature of the display device arrangement used to display graphical elements of the game to the player, and regardless of the manner in which the display device arrangement operates.

One method embodying the principles of the invention includes displaying a button graphic on a touch screen video display device associated with a gaming machine. The button graphic defines a button display area on the touch screen video display device which may be touched to cause a touch screen controller associated with the touch screen video display device to generate a game feature input. In response to the game feature input, a game feature in a game offered through the gaming machine is modified in some fashion. In addition to displaying the button graphic, this preferred method further includes modifying the button graphic to add a first message regarding the game feature. This modification of the button graphic is performed in association with a modification of the game feature, and the first message includes text indicating that the game feature has been modified.

One preferred form of the invention applies to a game feature comprising a bonus game that may be conducted at a gaming machine in response to some triggering event for the bonus game. The gaming machine is made eligible for the bonus game by some action (an eligibility action such as a side bet for example) taken by the player at the gaming machine. The eligibility action adds time to a countdown timer for the respective gaming machine, which counts down or otherwise tracks a period of gaming machine eligibility for the bonus game. If the bonus game triggering event occurs during the period of eligibility, the player at the gaming machine may participate in the bonus game upon the occurrence of the bonus game triggering event. In this application of the invention, modifying the game feature includes changing a state of the gaming machine from an ineligible state for the bonus game to an eligible state for the bonus game.

The information presentation method may also be applied to indicate to the player that a new eligibility action is required to make the gaming machine eligible for a game feature such as a bonus game. In this case the modification of the game feature comprises a change from an eligible state for the bonus game to an ineligible state for the bonus game. Also, the first message in this case comprises an ineligibility message including text indicating that the gaming machine is ineligible for the bonus game.

Some preferred forms of the information presentation technique further include modifying the button graphic to add a second message after adding the first message. A third and subsequent messages may be added after the second message, each subsequent message including text indicating or describing some aspect of the game feature. One example of a second message that may be added to the button graphic is an eligibility requirement message including text indicating requirements for changing the state of the gaming machine from the ineligible state for the bonus game to the eligible state for the bonus game.

A gaming machine according to the present invention includes a touch screen video display device displaying a button graphic and a touch screen controller for generating a game feature input in response to a touch of the button graphic. The gaming machine further includes a presentation controller for modifying a game feature in a game offered through the gaming machine, and for causing the button graphic to be modified to add the first message regarding the game feature. The presentation controller may be a processing device at the gaming machine which also coordinates and controls other gaming machine functions and operations.

It will be appreciated that the presentation controller may comprise one or more data processing devices operating under the control of operational program code. The present invention thus encompasses program products including program code that may be executed to modify the game feature and to cause the button graphic to be modified.

These and other advantages and features of the invention will be apparent from the following description of preferred embodiments, considered along with the accompanying drawings.

DESCRIPTION OF PREFERRED EMBODIMENTS

Figure 1:
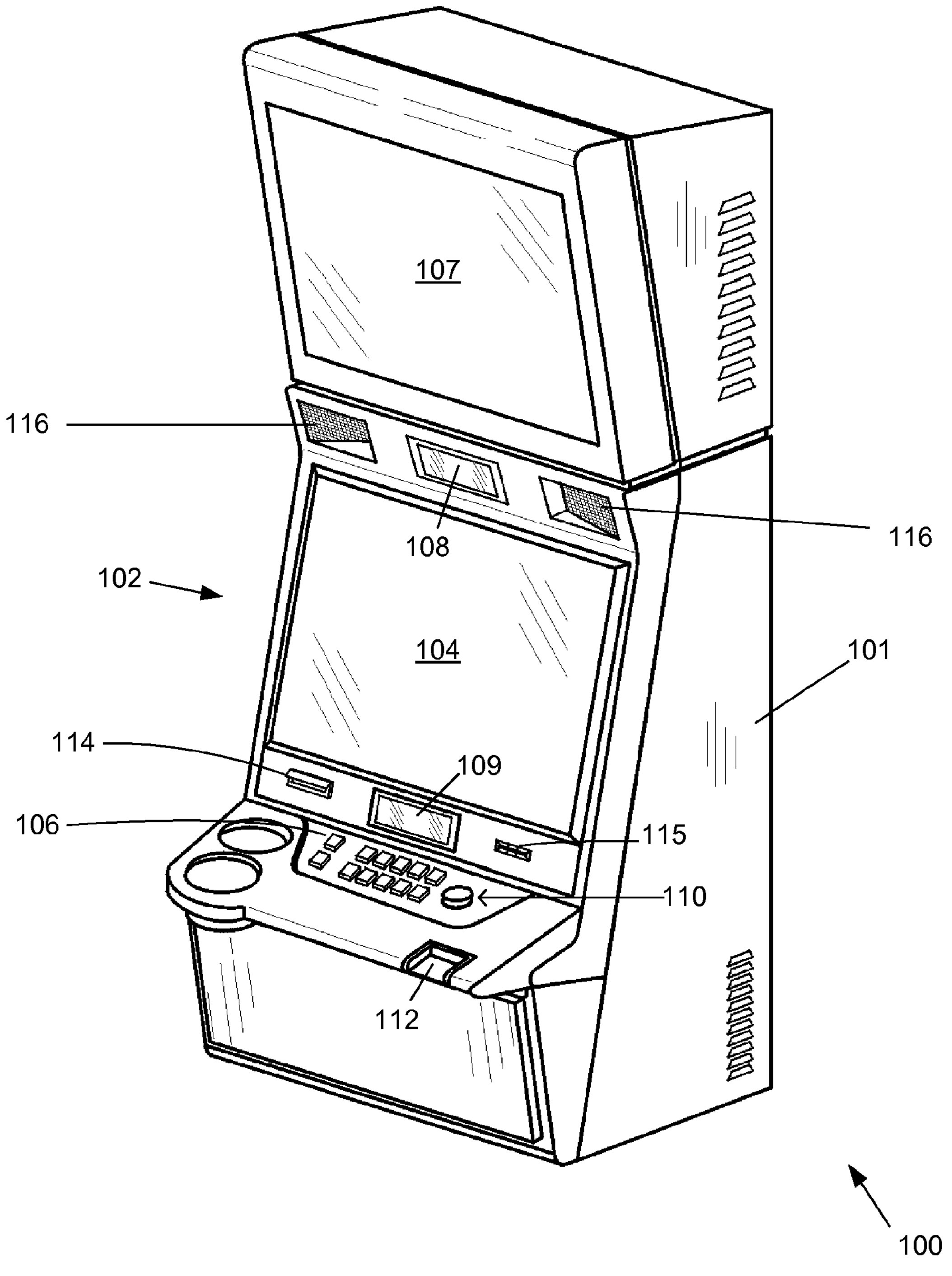
FIG. 1 is a view in front perspective of a gaming machine which may be used in a gaming system embodying the principles of the present invention.
Figure 2:
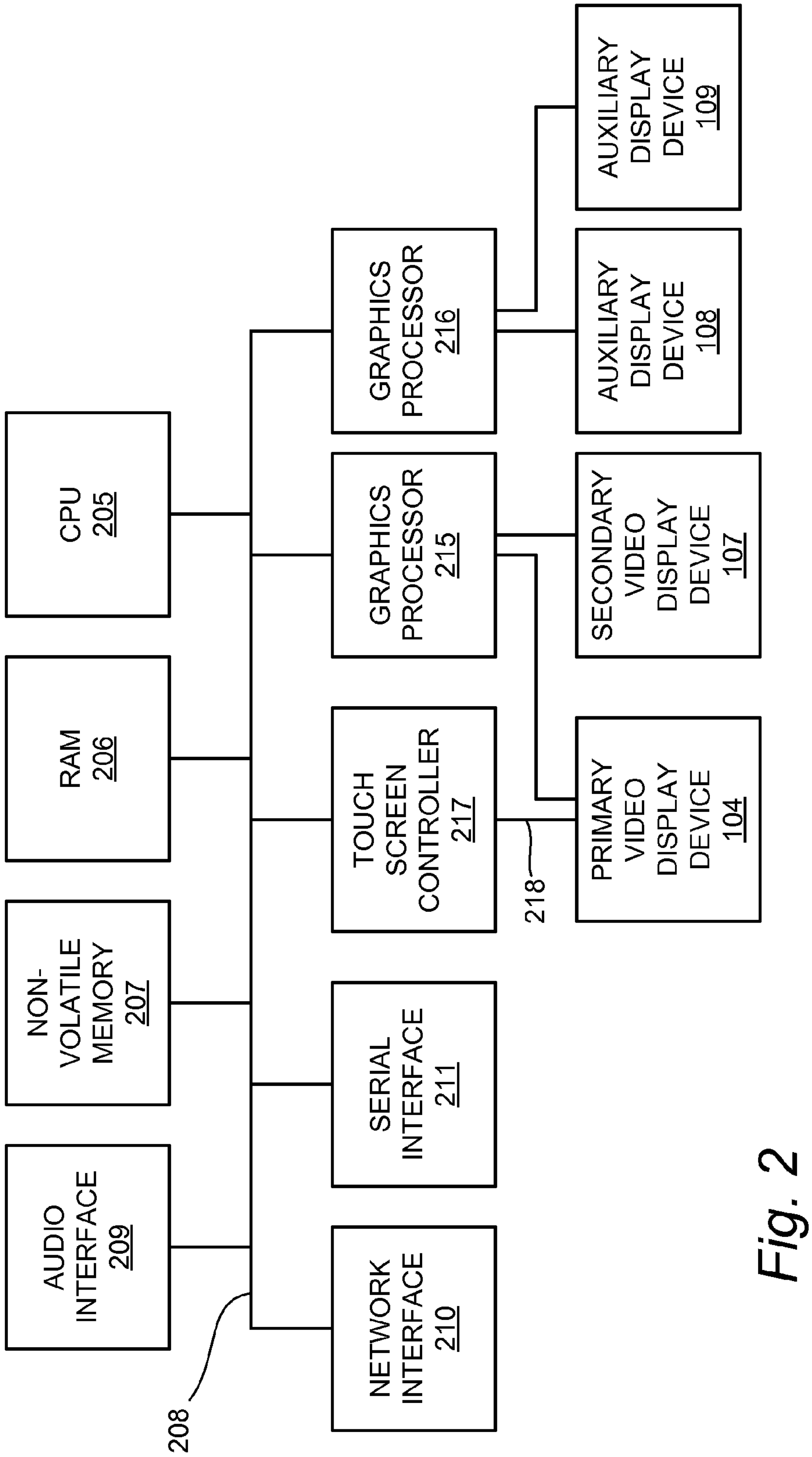
FIG. 2 is a diagrammatic representation showing various electronic components of the gaming machine shown in FIG. 1.

FIG. 1 shows a gaming machine 100 that may be used to implement a game feature information arrangement according to the present invention. The block diagram of FIG. 2 shows further details of gaming machine 100.

Referring to FIG. 1, gaming machine 100 includes a cabinet 101 having a front side generally shown at reference numeral 102. A primary video display device 104 is mounted in a central portion of the front surface 102, with a ledge (button panel) 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each video display device referenced herein may include any suitable video display device including a cathode ray tube, liquid crystal display, plasma display, LED display, or any other type of video display device currently known or that may be developed in the future.

Gaming machine 100 illustrated in FIG. 1, also includes a number of mechanical control buttons 110 mounted on ledge/button panel 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls, including a button graphic which may be touched to modify a game feature offered through the gaming machine as discussed in the summary section above.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 2 shows that gaming machine 100 includes a central processing unit (CPU) 205 along with random access memory 206 and nonvolatile memory or storage device 207. All of these devices are connected on a system bus 208 with an audio interface device 209, a network interface 210, and a serial interface 211. A graphics processor 215 is also connected on bus 208 and is connected to drive primary video display device 104 and secondary video display device 107 (both mounted on cabinet 101 as shown in FIG. 1). A second graphics processor 216 is also connected on bus 208 in this example to drive the auxiliary display devices 108 and 109 also shown in FIG. 1. As shown in FIG. 2, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 2 are elements commonly associated with a personal computer. These elements are preferably mounted on a standard personal computer chassis and housed in a standard personal computer housing which is itself mounted in cabinet 101 shown in FIG. 1. Alternatively, the various electronic components may be mounted on one or more circuit boards housed within cabinet 101 without a separate enclosure such as those found in personal computers. Those familiar with data processing systems and the various data processing elements shown in FIG. 2 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 2 as being connected directly on system bus 208 may in fact communicate with the other system components through a suitable expansion bus. Audio interface 209, for example, may be connected to the system via a PCI bus. System bus 208 is shown in FIG. 2 merely to indicate that the various components are connected in some fashion for communication with CPU 205, and is not intended to limit the invention to any particular bus architecture. Numerous other variations in the gaming machine internal structure and system may be used without departing from the principles of the present invention.

It will also be appreciated that although separate graphics processor 215 is shown for controlling primary video display device 104 and secondary video display device 107, and graphics processor 216 is shown for controlling both auxiliary display devices 108 and 109, CPU 205 may control all of the display devices directly without any intermediate graphics processor. The invention is not limited to any particular arrangement of processing devices for controlling the video display devices included with gaming machine 100. Also, a gaming machine implementing the present invention is not limited to any particular number of video display devices or other types of display devices, provided some display arrangement is included for displaying the button graphic according to the present invention as described in the summary section and as will be described further below.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game and bonus game that may be available through the gaming machine and for performing the functions associated with modifying the button graphic and game feature for which information is provided according to the invention. CPU 205 executes game feature program code for modifying the game feature offered through the gaming machine and executes button graphic program code for causing the button graphic to be modified to provide the desired information. CPU 205 also executes software related to communications handled through network interface 210, and software related to various peripheral devices such as those connected to the system through audio interface 209, serial interface 211, and touch screen controller 217. CPU 205 may further execute software to perform accounting functions associated with game play. Random access memory 206 provides memory for use by CPU 205 in executing its various software programs, while the nonvolatile memory or storage device 207 may comprise a hard drive or other mass storage device providing storage for programs not in use or for other data generated or used in the course of gaming machine operation. Network interface 210 provides an interface to other components of a gaming system in which gaming machine 100 may be included.

The present invention is not limited to gaming machines employing the personal computer-type arrangement of processing devices and interfaces shown in example gaming machine 100. Other gaming machines may include one or more special purpose processing devices to perform the various processing steps for implementing the present invention and thus serve as the presentation controller. Unlike general purpose processing devices such as CPU 205, these special purpose processing devices may not employ operational program code to direct the various processing steps.

The invention is also not limited to gaming machines including only video display devices for conveying results. It is possible to implement a primary or bonus game within the scope of the present invention using an electro-mechanical arrangement. For example, a gaming machine suitable for implementing the present invention may include a mechanical reel-type display rather than a video-type display device for displaying results in a primary game, and include a video display device for presenting a bonus game. Thus, a gaming machine suitable for use in the present invention may have a structure similar to that shown for gaming machine 100 in FIG. 1, but with a mechanical reel-type display replacing the primary video display device 104, and the video display device 107 being used for displaying the bonus game and the button graphic. Video display devices 108 and 109 may also be used for displaying the button graphic.

Figure 3:
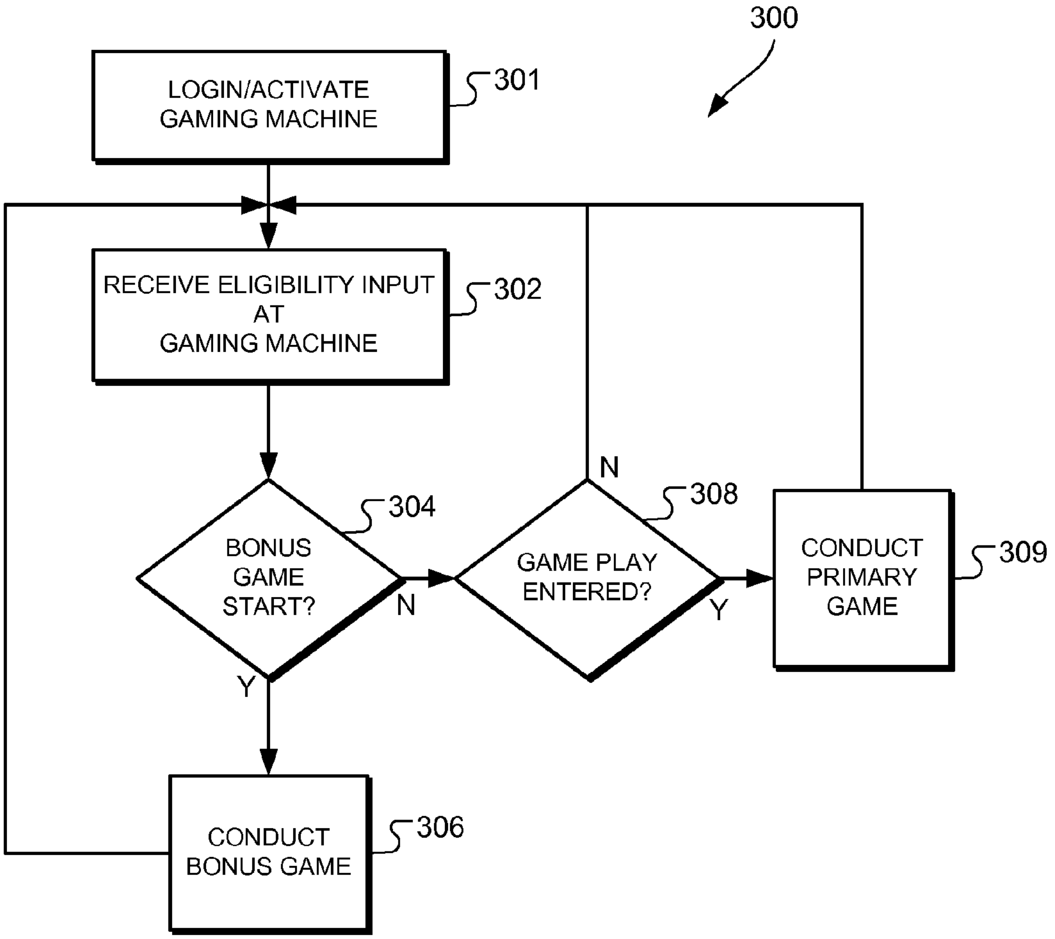
FIG. 3 is a flow chart showing the general process of play at a gaming machine that includes a bonus game according to one embodiment of the invention.

FIG. 3 shows a process 300 that may be performed at a gaming machine 100 shown in FIGS. 1 and 2. In particular, process 300 illustrates the interaction between a primary game that may be available at a respective gaming machine 100, and a bonus game available through the gaming machine. Once the player logs in at gaming machine 100 or otherwise activates the gaming machine as indicated at process block 301, the player may make a suitable eligibility input at the gaming machine as indicated at process block 302. If a bonus game is started as indicated by a positive outcome at decision box 304, the process proceeds to conduct a bonus game as indicated at process block 306. Once the bonus game is completed, the process loops back to receive another eligibility input as necessary. A negative outcome at decision box 304 may occur if there is no triggering event for the bonus game or if the gaming machine is not in an eligible state for the bonus game. If the bonus game is not starting for the respective gaming machine 100 as indicated by a negative outcome at decision box 304, the process proceeds to conduct a primary game as indicated at process block 309 in the event that a primary game initiating input, that is, a "game play," has been entered as indicated by a positive outcome at decision box 308. If a game play has not been entered at the gaming machine, the process loops back to receive another eligibility input as necessary and to determine if the bonus game is to start.

Process 300 shown in FIG. 3 is a simplified process included in this disclosure to indicate that a gaming machine implementing the present game feature information arrangement may involve an eligibility input required for participation in a bonus game. In one preferred embodiment, a gaming machine may be made eligible for the bonus game by placing a suitable side bet at the gaming machine. In this embodiment, a particular side bet entered at the respective gaming machine 100 places the gaming machine in an eligible state for a given period of time. Thus the player at the gaming machine will be allowed to participate in a bonus game that starts within the period of eligibility after the side bet. The respective gaming machine 100 may maintain a countdown timer showing the time of eligibility remaining. A component of the gaming machine 100 may monitor the eligibility time remaining and, when the eligibility time is about to expire, produce a suitable prompt for the player providing a suitable indication to that effect and providing the player an opportunity to renew the eligibility by making another side bet.

It will be appreciated by those skilled in the art that eligibility for a bonus game may be handled in a number of ways within the scope of the present invention. Also, some forms of the invention may not require a separate eligibility input but instead may make the gaming machine eligible in response to a particular bet level in the primary game at the gaming machine.

Although process 300 in FIG. 3 assumes that both a primary game and a bonus game are available through gaming machine 100, the game feature information arrangement according to the present invention is not limited to application in gaming machines offering primary and bonus games. That is, the button graphic display and button graphic modification according to the present invention may be employed with any game feature comprising or associated with a primary game or a bonus game.

Figure 4:
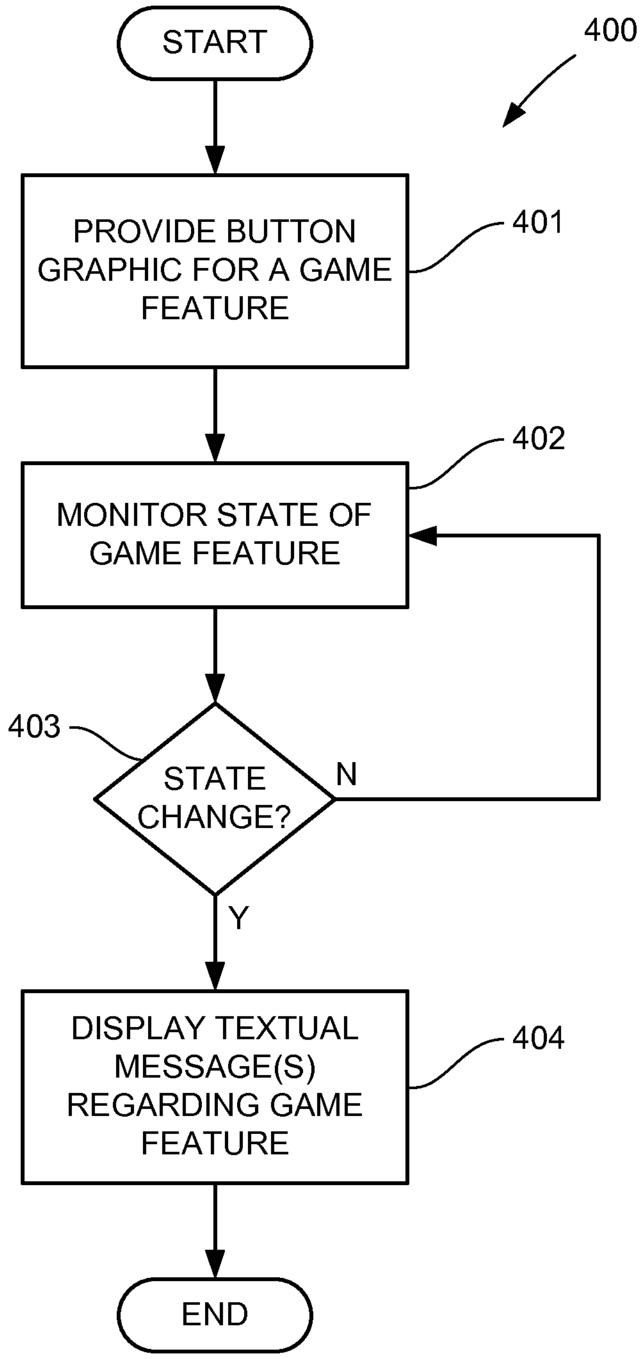
FIG. 4 is a flow chart showing a method for providing game feature information through a button graphic.

FIG. 4 comprises a flow chart showing one preferred process 400 for providing game feature information through a touch screen button graphic according to the invention. The method includes providing a button graphic for a game feature as shown at process block 401. This step involves generating suitable commands for the touch screen video display to cause the device to display the button graphic. When the button graphic is invoked, that is, when the area of the button graphic on the touch screen display is touched, the touch screen controller (such as touch screen controller 217 in FIG. 2) generates a game feature input. The gaming machine responds to this game feature input by modifying the game feature in some fashion. It will be appreciated that this use of a button graphic or virtual button is very common in gaming machines. Button graphics may be used to place bets, select denominations, select pay lines, and initiate plays in a game just to name a few applications. The information presentation method 400 shown in FIG. 4 may be applied to any button graphic regardless of the particular game feature which the button graphic affects. That is, the button graphic provided according to process block 400 may be provided for any game feature. The use in connection with gaming machine eligibility for a bonus game described further below in connection with the example button graphic of FIGS. 5-9 is merely one application of the information presentation method.

Method 400 further includes monitoring the state of the game feature which the button graphic affects as indicated at process block 402. In response to a change in the state of the game feature as indicated by a positive outcome at decision block 403, the illustrated method includes displaying a first message regarding the game feature as shown at process block 404. As will be shown below in connection with FIG. 6, the first message includes text indicating that the game feature has been modified. If the outcome at decision block 403 is negative, the process returns to monitor the state of the game feature at process block 402.

The step of monitoring the state of the game feature at process block 402 may be accomplished in any suitable fashion. The monitoring step may be performed by the main processor of the gaming machine, such as CPU 205 shown in FIG. 2. However, the monitoring step may involve gaming system components remote from the particular gaming machine in some applications. It should be noted that in some cases a game feature state change may occur in response to invoking the button graphic displayed according to process block 401, that is, in response to a touch of the button graphic. In this case, the monitoring step may be accomplished by monitoring for a game feature input signal generated in response to the touch of the button graphic. However, a game feature state change may occur without a touch of the button graphic, for example upon expiration of eligibility for a bonus game. Monitoring for a game feature state change in this case may involve monitoring the hardware or program code component that changes the eligibility status of the gaming machine. Also, some forms of the present invention may not include a monitoring step to detect a change in state as indicated at process block 402 in FIG. 4. For example, where a game feature state change occurs in response to touching the button graphic, the hardware that changes the state of the game feature may generate a command to cause the button graphic to be modified. Likewise, where a game feature state change occurs without a touch of the button graphic, the hardware component that changes the state of the game feature may generate a command to cause the button graphic to be modified.

Any number of messages may be displayed in the step shown at process block 404 in FIG. 4. Since the area of the button graphic is limited, the messages typically will be short and multiple messages presented serially may be required in order to convey the desired information to the player. The one or more messages may indicate the state of the game feature. The message or messages may also or alternatively indicate the cost of the game feature or indicate how the game feature may be activated or deactivated. The cost of the game feature and indication of how the game feature may be activated both represent an eligibility requirement message. A message indicating that the gaming machine is in the ineligible state represents an ineligibility message. In any case, the messages will include text information on the game feature which is affected by the button graphic, that is, the game feature which is affected by the input generated in response to a touch of the button graphic. It should be noted that the textual messages may be presented together with animations or other visual effects in the button display area. Also, animations may be ongoing in the button display area and not only associated with textual messages.

Figure 5:
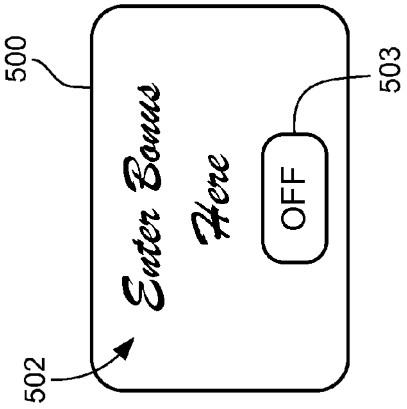
FIG. 5 is a representation of a button graphic that may be employed for making a side bet for a bonus game.

FIGS. 5 through 9 show examples of button graphics and various modifications to the button graphics that may be employed according to the present information presentation invention. FIG. 5 shows a button graphic 500 that may be displayed on a suitable video display device having touch screen capability, that is, having a touch screen film or other touch sensing arrangement and also being operatively associated with a touch screen controller. Main gaming machine video display device 104 shown in FIGS. 1 and 2 would be an appropriate device for displaying button graphic 500. Button graphic 500 in FIG. 5 includes a button display area generally shown in area 502 within the boundaries of the button graphic. This button display area is used to display various messages according to the invention. In particular, button display area 502 displays the message "Enter Bonus Here" in FIG. 5.

Figure 6:
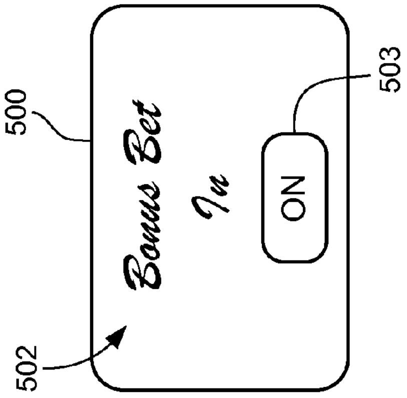
FIG. 6 is a representation of the button graphic shown in FIG. 5 after being modified to show a first message indicating that the gaming machine is eligible for a bonus game.
Figure 7:
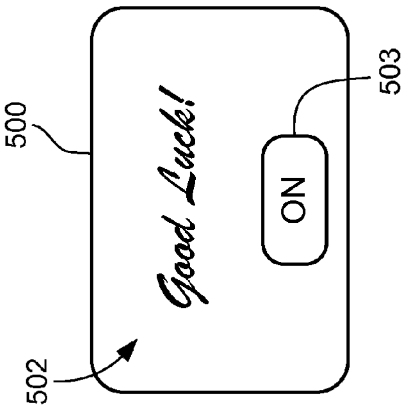
FIG. 7 is a representation of the button graphic shown in FIG. 6 after being modified to display a second message.

FIGS. 6 and 7 provide examples of modifications to button graphic 500 that may be employed in response to a game feature input generated by the touch screen controller in response to a touch of the button graphic. The game feature input prompts a modification of the game feature, which in this case is the eligibility state of the gaming machine for the bonus game. Touching button graphic 500 results in the modification of the game feature by making the gaming machine an eligible gaming machine for participation in a bonus game. In response to this change in state of the game feature (gaming machine eligibility for the bonus game), the button graphic is modified to add a first message in the button display area. The first message in the case of FIG. 6 comprises the message "Bonus Bet In." Note also that the change in eligibility state is indicated by an activation indicator 503 included in button graphic 500. This activation indicator comprised the text "OFF" in the state of the gaming machine shown in FIG. 5. However, since FIG. 6 shows the state of the gaming machine immediately after the bonus bet has been placed by invoking button graphic 500, FIG. 6 shows activation indicator 503 with the text "ON." Button graphic 500 has been modified again by the point in time that FIG. 7 represents. In this example, FIG. 7 shows button graphic 500 having been modified to show a second textual message, "Good Luck."

It will be appreciated that it is not necessary that a button graphic be modified to add two textual messages as shown in the example of FIGS. 6 and 7. Other embodiments may modify the button graphic to add only a single message such as that shown in FIG. 6, or a series of more than two messages. In any event, the modification from an initial condition of the button graphic to add the first message is preferably performed closely in time to the change in game state that prompted the addition of the message, that is, in association with the change of the game state. For example, the modification of button graphic 500 to show the "Bonus Bet In" message is preferably performed immediately upon change of the game feature, in this case placing the gaming machine in the eligible state for the bonus game. Subsequent messages such as the message "Good Luck" shown in FIG. 7 can be added according to any appropriate time line, preferably after a few seconds of displaying the "Bonus Bet In" message. It will also be noted from FIGS. 6 and 7 that the textual message in button display area 502 may change without a change in the activation indicator 503. Only the initial or first message added in response to a game feature change is accompanied by a change of the activation indicator 503.

Figure 8:
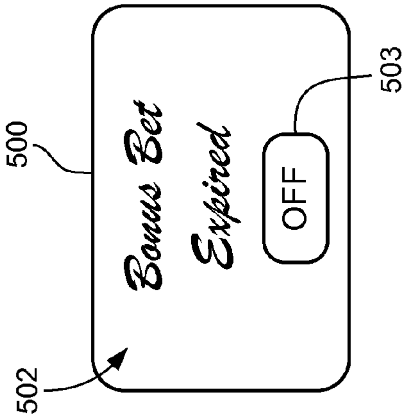
FIG. 8 is a representation of the button graphic shown in FIG. 7 after being modified in response to the gaming machine becoming again ineligible for the bonus game.
Figure 9:
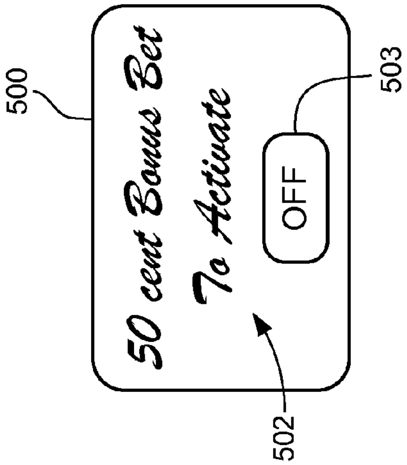
FIG. 9 is a representation of the button graphic shown in FIG. 8 after being modified to add an eligibility requirement message.

FIGS. 8 and 9 illustrate the situation in which the game feature state has changed again, this time because an eligibility period has expired. This is in contrast to the situation in FIG. 6 in which the game feature state has changed in response to the player having invoked button graphic 500. FIG. 8 shows that in response to the game feature changing to an ineligible state, button graphic 500 is modified to display a different first message, namely, the ineligibility message "Bonus Bet Expired." This textual message together with the change of activation indicator 503 to "OFF" informs the player that the gaming machine is no longer eligible for participation in a bonus game. FIG. 9 shows a second message, the eligibility requirement message "50 cent Bonus Bet to Activate" having been added to button graphic 500 to provide information on activating the game feature.

The information display arrangement according to the invention is not limited to the above-described examples of textual messages. Any suitable textual messages may be displayed according to the invention. Also, the game feature information technique is not limited to use with bonus games or any other type of game.

As used herein, the terms "comprising," "including," "carrying," "having," "containing," "involving," and the like are to be understood to be open-ended, that is, to mean including but not limited to. Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method of presenting game feature information through a gaming machine, the method including:

(a) displaying a button graphic on a touch screen video display device associated with a gaming machine, the button graphic defining a button display area which, when touched, causes a touch screen controller associated with the touch screen video display device to generate a game feature input for the gaming machine which in turn causes the gaming machine to take an action relating to a game feature;

(b) in association with taking the action, changing the button graphic to add a first message regarding the game feature, the first message including text regarding the action taken;

(c) the game feature further comprising a bonus game, and wherein taking the action includes changing a state of the gaming machine from an ineligible state for the bonus game to an eligible state for the bonus game, and wherein the first message includes text indicating that the gaming machine is in the eligible state for the bonus game; and (d) wherein taking the action includes applying a bonus game wager for a play in the bonus game.

2. The method of claim 1 wherein the bonus game wager is in addition to a primary game wager for a primary game played through the gaming machine.

3. The method of claim 2 wherein the bonus game is triggered periodically during the course of multiple plays in the primary game.

4. The method of claim 1 wherein the first message includes a countdown timer indicating a time remaining for the eligible state for the bonus game.

5. A gaming machine including:

(a) a display system;

(b) a player input system, the player input system including one or more touch screen areas of the display system and a touch screen controller system;

(c) at least one processor;

(d) at least one memory device storing instructions executable by the at least one processor to:

(i) cause the display system to display a button graphic in one of the touch screen areas, the button graphic defining a button display area which, when touched, causes the touch screen controller system to generate a game feature input for the gaming machine;

(ii) responsive to the game feature input, take an action relating to a game feature;

(iii) in association with taking the action, cause the button graphic to add a first message regarding the game feature, the first message including text regarding the action taken;

(e) wherein the game feature comprises a bonus game, and wherein taking the action includes changing a state of the gaming machine from an ineligible state for the bonus game to an eligible state for the bonus game, and wherein the first message includes text indicating that the gaming machine is in the eligible state for the bonus game; and (f) wherein taking the action includes applying a bonus game wager for a play in the bonus game.

6. The gaming machine of claim 5 wherein the bonus game wager is in addition to a primary game wager for a primary game played through the gaming machine.

7. The gaming machine of claim 6 wherein the bonus game is triggered periodically during the course of multiple plays in the primary game.

8. A method including:

(a) displaying a button graphic on a touch screen video display device associated with a gaming machine, the button graphic defining a button display area and including a first message regarding a game feature;

(b) responsive to a triggering event at the gaming machine, changing the button graphic to display a second message regarding the game feature, the second message including text indicating how to invoke the game feature; further including switching back to the first message in response to a touch input in the button display area; and (c) adding a third message to the button graphic, the third message comprising additional text separate from the text of the first message and the second message, and the third message being added without any change to the game feature.

9. The method of claim 8 wherein the triggering event comprises the expiration of eligibility for the game feature at the gaming machine, and wherein the second message includes an indication that eligibility for the first game feature has expired.

* * * * *